Patented Apr. 19, 1932

1,855,016

UNITED STATES PATENT OFFICE

LEON W. GELLER, OF SYRACUSE, NEW YORK, ASSIGNOR TO AMERICAN CHICLE COMPANY, OF LONG ISLAND CITY, NEW YORK, A CORPORATION OF NEW YORK

CHEWING GUM BASE

No Drawing. Application filed October 2, 1928. Serial No. 309,896.

The object of the present invention is to provide a chewing gum base composition incorporating as one of its principal ingredients rubber, particularly crepe rubber, and chlorparaffin resins, in such manner that the base thereby produced is substantially free from any sticky or waxy properties and disintegrating effect upon the rubber by the added ingredients is avoided. It has heretofore been proposed to employ cumaron resin as an ingredient, but not the principal ingredient, of bases for chewing gums, but, being a coal tar product, it is undesirable, and requires the use of relatively large proportions of pure chicle.

It has also been proposed to employ, with rubber, various waxes and oils such as Japan wax, paraffin, hydrogenated peanut oil, etc., but the result has generally been disintegration of the rubber, so that after depolymerization of the rubber by the said oils, fats or waxes, it has been found necessary to remove the latter or a substantial proportion of the same. It has also been proposed to employ colophony in the form of a glycerol ester in conjunction with so-called "vulcanized" oil, but the base thereby made has the tendency to disintegrate and is open to other objections. The various objections to the heretofore proposed synthetic chewing bases incorporating rubber are overcome by the present invention in the production of a tasteless base, resistant to disintegration, having the general physical characteristics of a chicle base and at the same time of greatly lessened cost.

As an example of my invention I take chlorparaffin resin and mix it with depolymerized crepe rubber. The mixture is heated, cooled and re-heated, whereupon the rubber will dissolve in the resin mixture. The mixture may then be cooled and kneaded until it forms a homogeneous mass. Chlorparaffin resin consists generally of paraffin dissolved in carbon tetrachloride and subjected to chlorine gas preferably in the presence of a catalyzer. The depolymerization of the rubber may be effected, if desired, with the chlorparaffin resins, and I have observed that the harder the resin the better the depolymerization will be. To effect depolymerization, the mixed resin and rubber is subjected to heat, for example a temperature of about 120° C. for a period of time sufficient to effect the depolymerization.

As a specific example of my invention I take 2½ parts of "hard" chlorparaffin resin, that is to say a resin in which the chlorine treatment has been continued until the resin at ordinary temperature has somewhat the physical characteristics of pine rosin, and 1 part of soft chlorparaffin resin, that is to say a resin in the production of which the chlorine treatment has been stopped when the resin assumes a thick somewhat fluid form, and 1 part of depolymerized rubber. This forms a chewing gum base which I term the "tough" base. For a softer base I take 7 parts of the hard chlorparaffin resin, 7 parts of the soft chlorparaffin resin and mix the same with 4 parts of depolymerized crepe rubber.

The above examples may be widely varied in the production of a suitable chewing gum base, in accordance with the specific physical characteristics of the base required. The resins and depolymerized rubber may be mixed by melting them together in a steam bath, cooling the melt and kneading the same until the desired homogeneous mass is obtained.

A chewing base of very excellent quality may be made by combining a relatively soft base composed of the soft chlorparaffin resin, the hard chlorparaffin resin, and depolymerized rubber, for example in the proportion of 7, 7, 4 parts respectively, with a very tough base which of itself shows relatively low elasticity and ductility. As an example of this very tough base I may employ 10 parts of soft chlorparaffin resin, 25 parts of hard chlorparaffin resin and 10 parts of depolymerized rubber.

The two bases may be mixed in the desired proportions, as for example equal proportions, by melting them together in a steam bath, cooling the batch and mixing or kneading.

Having described my invention what I claim and desire to secure by Letters Patent is as follows:—

1. A chewing gum base comprising a mixture of soft chlorparaffin resin, hard chlorparaffin resin and depolymerized rubber, the resin being in excess of the rubber.

2. A chewing gum base comprising chlorparaffin resin and rubber, the resin predominating in volume.

In testimony whereof, I have signed my name to this specification.

LEON W. GELLER.